US012035130B2

(12) United States Patent
Chon et al.

(10) Patent No.: US 12,035,130 B2
(45) Date of Patent: Jul. 9, 2024

(54) METHOD AND APPARATUS FOR RENDERING ACOUSTIC SIGNAL, AND COMPUTER-READABLE RECORDING MEDIUM

(71) Applicant: SAMSUNG ELECTRONICS CO., LTD., Suwon-si (KR)

(72) Inventors: Sang-Bae Chon, Suwon-si (KR); Sun-Min Kim, Yongin-si (KR); Hyun Jo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/841,412

(22) Filed: Jun. 15, 2022

(65) Prior Publication Data

US 2022/0322027 A1 Oct. 6, 2022

Related U.S. Application Data

(63) Continuation of application No. 15/129,218, filed as application No. PCT/KR2015/002891 on Mar. 24, 2015, now abandoned.

(Continued)

(51) Int. Cl.
*H04S 7/00* (2006.01)
*G10L 19/008* (2013.01)
*H04S 3/00* (2006.01)

(52) U.S. Cl.
CPC ............ *H04S 7/308* (2013.01); *G10L 19/008* (2013.01); *H04S 3/002* (2013.01); *H04S 3/008* (2013.01);

(Continued)

(58) Field of Classification Search
CPC .......... H04S 7/308; H04S 3/002; H04S 3/008; H04S 2400/01; H04S 2400/03;

(Continued)

(56) References Cited

U.S. PATENT DOCUMENTS 5,602,922 A 2/1997 Lee
8,296,155 B2 10/2012 Pang et al.

(Continued)

FOREIGN PATENT DOCUMENTS

CN 102272840 A 12/2011
CN 102687536 A 9/2012

(Continued)

OTHER PUBLICATIONS

Communication dated Aug. 27, 2019, from the Japanese Patent Office in counterpart application No. 2018-186791.

(Continued)

*Primary Examiner* — Daniel R Sellers
(74) *Attorney, Agent, or Firm* — Sughrue Mion, PLLC

(57) ABSTRACT

In cases of rendering a multichannel signal such as a 22.2 channel signal as a 5.1 channel signal, a three dimensional (3D) audio signal may be reproduced using a two dimensional (2D) output channel, but rendered audio signals are sensitively affected by a layout of speakers and may cause distortion of a sound image when the layout of arranged speakers is different from a standard layout. The present invention may solve the aforementioned problem of the prior art. The audio signal rendering method for reducing distortion of a sound image even when the layout of the arranged speakers is different from the standard layout, according to one embodiment of the present invention, includes: receiving a multi-channel signal including a plurality of input channels that are to be converted to a plurality of output channels; obtaining deviation information about at (Continued)

least one output channel, from a location of a speaker and a standard location corresponding to each of the plurality of output channels; and modifying a panning gain from a height channel included in the plurality of input channels to the output channel having the deviation information, based on obtained deviation information.

3 Claims, 19 Drawing Sheets

Related U.S. Application Data

(60) Provisional application No. 61/969,357, filed on Mar. 24, 2014.

(52) U.S. Cl.
CPC ....... *H04S 2400/01* (2013.01); *H04S 2400/03* (2013.01); *H04S 2400/11* (2013.01); *H04S 2400/13* (2013.01); *H04S 2420/01* (2013.01); *H04S 2420/03* (2013.01)

(58) Field of Classification Search
CPC ............. H04S 2400/11; H04S 2400/13; H04S 2420/01; H04S 2420/03; G10L 19/008
See application file for complete search history.

(56) References Cited

U.S. PATENT DOCUMENTS

| | | | | |
|---|---|---|---|---|
| 8,577,686 | B2 | 11/2013 | Oh et al. | |
| 9,257,128 | B2 | 2/2016 | Beack et al. | |
| 9,372,251 | B2 | 6/2016 | Soulodre | |
| 9,697,844 | B2 | 7/2017 | Walsh et al. | |
| 9,787,266 | B2 | 10/2017 | Oh et al. | |
| 2004/0151476 | A1* | 8/2004 | Suzuki .................... | H04S 7/301 386/239 |
| 2005/0078833 | A1* | 4/2005 | Hess ..................... | G01S 3/8083 381/26 |
| 2007/0133813 | A1 | 6/2007 | Morishima | |
| 2008/0008327 | A1 | 1/2008 | Ojala et al. | |
| 2008/0031462 | A1 | 2/2008 | Walsh et al. | |
| 2008/0304670 | A1 | 12/2008 | Breebaart | |
| 2009/0006106 | A1 | 1/2009 | Pang et al. | |
| 2009/0092259 | A1 | 4/2009 | Jot et al. | |
| 2009/0110204 | A1 | 4/2009 | Walsh et al. | |
| 2010/0303246 | A1 | 12/2010 | Walsh et al. | |
| 2011/0116638 | A1* | 5/2011 | Son ......................... | H04S 3/008 381/1 |
| 2011/0188662 | A1 | 8/2011 | Jensen et al. | |
| 2011/0222693 | A1 | 9/2011 | Lee et al. | |
| 2011/0222694 | A1 | 9/2011 | Del Galdo et al. | |
| 2011/0301729 | A1 | 12/2011 | Heiman et al. | |
| 2012/0008789 | A1* | 1/2012 | Kim .......................... | H04S 5/00 381/17 |
| 2012/0170757 | A1 | 7/2012 | Kraemer et al. | |
| 2012/0250869 | A1 | 10/2012 | Ohashi | |
| 2013/0003999 | A1 | 1/2013 | Reverchon et al. | |
| 2014/0119581 | A1 | 5/2014 | Tsingos et al. | |
| 2015/0194158 | A1 | 7/2015 | Oh et al. | |
| 2015/0271622 | A1 | 9/2015 | Dausel | |
| 2016/0044434 | A1* | 2/2016 | Chon ...................... | H04S 3/008 381/18 |
| 2016/0255454 | A1* | 9/2016 | McGrath ................. | H04S 5/005 381/2 |
| 2016/0269845 | A1 | 9/2016 | Chon et al. | |

FOREIGN PATENT DOCUMENTS

| | | | |
|---|---|---|---|
| CN | 103081512 | A | 5/2013 |
| EP | 2 389 017 | A2 | 11/2011 |
| EP | 2 590 164 | A2 | 5/2013 |
| JP | 2006-319823 | A | 11/2006 |
| JP | 2011-193164 | A | 9/2011 |
| JP | 2013-533703 | A | 8/2013 |
| JP | 2014-3493 | A | 1/2014 |
| KR | 1020080089308 | A | 10/2008 |
| KR | 1020120004909 | A | 1/2012 |
| KR | 1020150047943 | A | 5/2015 |
| RU | 2 406 165 | C2 | 12/2010 |
| RU | 2 449 388 | C2 | 4/2012 |
| RU | 2 450 440 | C1 | 5/2012 |
| WO | 2007/031906 | A2 | 3/2007 |
| WO | 2013/064943 | A1 | 5/2013 |
| WO | 2013142653 | A1 | 9/2013 |
| WO | 2014/013070 | A1 | 1/2014 |
| WO | 2014021588 | A1 | 2/2014 |

OTHER PUBLICATIONS

Communication dated Apr. 14, 2020 from the Japanese Patent Office in application No. 2018-186791.
Communication dated Jun. 30, 2020, from the Brazilian Patent Office in counterpart application No. BR112016022042-0.
Communication dated Feb. 25, 2021, issued by the Korean Patent Office in counterpart Korean Patent Application No. 2016-7029478.
Communication dated May 6, 2021, issued by the European Patent Office in counterpart European Application No. 21153927.5.
Lee et al., "Immersive Virtual Sound Beyond 5.1 Channel Audio," Audio Engineering Society, Convention Paper 8117, Presented at the 128$^{th}$ Convention, May 2010, total 9 pages, XP040509500.
Communication dated May 26, 2021 issued by the Russian Intellectual Property Office in counterpart Russian Application No. 2018101706.
Communication dated Aug. 20, 2019, from the Japanese Patent Office in counterpart application No. 2018-186791.
Communication dated Mar. 25, 2019, from the State Intellectual Property Office of People's Republic of China in counterpart Application No. 201580027499.8.
Communication dated Apr. 9, 2019, issued by the Australian IP Office in counterpart Australian Patent Application No. 2018200684.
Office Action dated Nov. 22, 2018 by the Intellectual Property Office of Australia in counterpart Australian Patent Application No. 2018200684.
Communication dated May 29, 2018, from the Japanese Patent Office in counterpart application No. 2016-558679.
Lee, Young Woo et al., "Audio Engineering Society Convention Paper Virtual Height Speaker Rendering for Samsung 10.2—channel Vertical Surround System", Audio Engineering Society, Convention Paper 8523, Presented at the 131st Convention, Oct. 20, 2011-Oct. 23, 2011, New York, NY, USA, pp. 1-10, XP055323908, (10 pages total).
Communication dated Oct. 24, 2017 by the Japanese Patent Office in counterpart Japanese Patent Application No. 2016-558679.
Communication dated Nov. 2, 2017 by the European Patent Office in counterpart European Patent Application No. 15768374.9.
Communication dated Nov. 22, 2017 by the Russian Federal Service for Intellectual Property in counterpart Russian Patent Application No. 2016141268.
Office Action dated Jun. 8, 2017, issued by the Australian Patent Office in counterpart Australian Application No. 2015234454.
Communication dated Jul. 5, 2017, from the Canadian Intellectual Property Office in counterpart application No. 2943670.
Sung Young, "Surround Audio col. 9.2 Vbap", Audioguy, May 28, 2008, (http://audioguy.co.kr/board/bbs/board.php?bo_table=c_surround&wr_id=127&sst=wr_good&sod=asc&sop=and&page=I), total 5 pages (See p. 1).
"Multichannel sound technology in home and broadcasting applications", ITU-R, BS.2159-0, May 18, 2010 (http://www.itu.int/pub/R-REP-BS.2159), Total 34 pages.
Search Report (PCT/ISA/210) dated Jun. 5, 2015, issued by the International Searching Authority in counterpart International Application No. PCT/KR2015/002891.
Written Opinion (PCT/ISA/237) dated Jun. 5, 2015, issued by the International Searching Authority in counterpart International Application No. PCT/KR2015/002891.

(56) References Cited

OTHER PUBLICATIONS

"Multichannel Stereophonic Sound System with and without accompanying Picture," ITU-R Recommendation BS.775, 2012, Total 11 pages.
Ville Pulkki, "Virtual Sound Source Positioning using Vector Base Amplitude Panning," Journal of AES, vol. 45 , 1997, pp. 456-466.
K. Hamasaki, et al., "Advanced Multichannel Audio Systems with Superior Impression of Presence and Reality," 116th AES Convention, May 8-11, 2004, Berlin, Germany, Total 12 pages.
Communication dated Jan. 19, 2022 by the China National Intellectual Property Administration in Chinese Patent Application No. 202110273856.6.
Communication dated Jun. 30, 2023 issued by the European Patent Office in counterpart European Application No. 21153927.5.

* cited by examiner

METHOD AND APPARATUS FOR RENDERING ACOUSTIC SIGNAL, AND COMPUTER-READABLE RECORDING MEDIUM

RELATED APPLICATIONS

This application is a Continuation of U.S. application Ser. No. 15/129,218 filed Sep. 26, 2016, which is a National stage entry of International Application No. PCT/KR2015/002891, filed on Mar. 24, 2015, which claims the benefit of U.S. Provisional Application No. 61/969,357, filed on Mar. 24, 2014, in the United States Patent and Trademark Office. The disclosures of each of the applications are herein incorporated by reference in their entirety.

TECHNICAL FIELD

The inventive concept relates to a method and apparatus for rendering audio signal, and more particularly, to a rendering method and apparatus for reproducing location of a sound image and tone color more accurately, by modifying a panning gain or a filter coefficient when there is a misalignment between a standard layout and an arrangement layout of output channels.

BACKGROUND ART

Stereophonic sound denotes a sound, to which spatial information is added, capable of reproducing a direction or a distance of a sound, as well as pitch and tone color of a sound, allowing a listener to have an immersive feeling, and making a listener, who does not exist in a space where a sound source has occurred, experience directional, distance, and spatial perceptions.

When a channel signal such as a 22.2 channel is rendered as a 5.1 channel, a three-dimensional (3D) stereophonic sound may be reproduced using a two-dimensional (2D) output channel, but rendered audio signals are so sensitive to a layout of speakers that a sound image distortion may occur if an arrangement layout of speakers is different from a standard layout.

DETAILED DESCRIPTION OF THE INVENTIVE CONCEPT

Technical Problem

As described above, when a channel signal such as a 22.2 channel is rendered as a 5.1 channel, a three-dimensional (3D) stereophonic sound may be reproduced using a two-dimensional (2D) output channel, but rendered audio signals are so sensitive to a layout of speakers that a sound image distortion may occur if an arrangement layout of speakers is different from a standard layout.

To address problems of the prior art, the inventive concept provides reduction in a sound image distortion even when a layout of installed speakers is different from a standard layout.

Technical Solution

In order to achieve the objective, the present invention includes embodiments below.

An audio signal rendering method includes: receiving a multi-channel signal comprising a plurality of input channels that are to be converted to a plurality of output channels; obtaining deviation information about at least one output channel, from a location of a speaker corresponding to each of the plurality of output channels and a standard location; and modifying a panning gain from a height channel included in the plurality of input channels to the output channel having the deviation information, based on obtained deviation information.

Advantageous Effects

According to the inventive concept, an audio signal may be rendered so as to reduce sound image distortion even if a layout of installed speakers is different from a standard layout or a location of a sound image has changed.

BEST MODE

Figure 1:
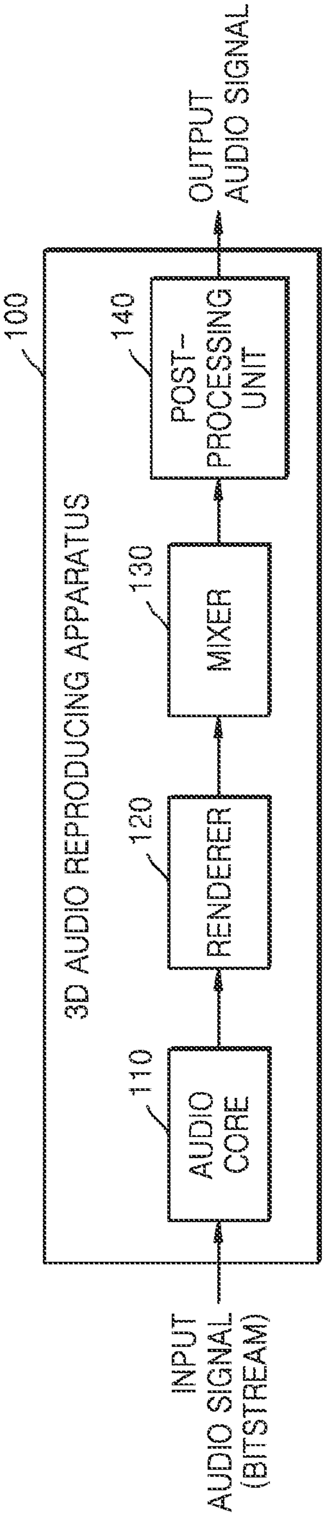
FIG. 1 is a block diagram illustrating an internal structure of a stereophonic sound reproduction apparatus according to an embodiment.

In order to achieve the objective, the present invention includes embodiments below.

According to an embodiment, there is provided an audio signal rendering method including: receiving a multi-channel signal comprising a plurality of input channels that are to be converted to a plurality of output channels; obtaining deviation information about at least one output channel, from a location of a speaker corresponding to each of the plurality of output channels and a standard location; and modifying a panning gain from a height channel included in the plurality of input channels to the output channel having the deviation information, based on obtained deviation information.

The plurality of output channels may be horizontal channels.

The output channel having the deviation information may include at least one of a left horizontal channel and a right horizontal channel.

The deviation information may include at least one of an azimuth deviation and an elevation deviation.

The modifying of the panning gain may modify an effect caused by an elevation deviation, when the obtained deviation information includes the elevation deviation.

The modifying of the panning gain may correct the panning gain by a two-dimensional (2D) panning method, when the obtained deviation information does not include the elevation deviation.

The correcting of the effect caused by the elevation deviation may include correcting an inter-aural level difference (ILD) resulting from the elevation deviation.

The correcting of the effect caused by the elevation deviation may include modifying the panning gain of the output channel corresponding to obtained elevation deviation, in proportional to the obtained elevation deviation.

A sum of square values of panning gains with respect to the left horizontal channel and the right horizontal channel may be 1.

According to an embodiment, there is provided an apparatus for rendering an audio signal, the apparatus including: a receiver configured to receive a multi-channel signal including a plurality of input channels that are to be converted to a plurality of output channels; an obtaining unit configured to obtain deviation information about at least one output channel, from a location of speaker corresponding to each of the plurality of output channels and a standard location; and a panning gain modifier configured to modify a panning gain from a height channel comprised in the plurality of input channels to the output channel having the deviation information, based on obtained deviation information.

The plurality of output channels may be horizontal channels.

The output channel having the deviation information may include at least one of a left horizontal channel and a right horizontal channel.

The deviation information may include at least one of an azimuth deviation and an elevation deviation.

The panning gain modifier may correct an effect caused by an elevation deviation, when the obtained deviation information includes the elevation deviation.

The panning gain modifier may modify the panning gain by a two-dimensional (2D) panning method, when the obtained deviation information does not include the elevation deviation.

The panning gain modifier may correct an inter-aural level difference caused by the elevation deviation to correct an effect caused by the elevation deviation.

The panning gain modifier may modify a panning gain of an output channel corresponding to the elevation deviation, in proportional to obtained elevation deviation, so as to correct an effect caused by the obtained elevation deviation.

A sum of square values of panning gains with respect to the left horizontal channel and the right horizontal channel may be 1.

According to an embodiment, there is provided a computer-readable recording medium having recorded thereon a computer program for executing the above method.

In addition, there are provided another method, another system, and a computer-readable recording medium having recorded thereon a computer program for executing the method.

MODE OF THE INVENTIVE CONCEPT

The detailed descriptions of the invention are referred to with the attached drawings illustrating particular embodiments of the invention. These embodiments are provided so that this disclosure will be thorough and complete, and will fully convey the concept of the invention to one of ordinary skill in the art. It will be understood that various embodiments of the invention are different from each other and are not exclusive with respect to each other.

For example, a particular shape, a particular structure, and a particular feature described in the specification may be changed from an embodiment to another embodiment without departing from the spirit and scope of the invention. Also, it will be understood that a position or layout of each element in each embodiment may be changed without departing from the spirit and scope of the invention. Therefore, the detailed descriptions should be considered in a descriptive sense only and not for purposes of limitation and the scope of the invention is defined not by the detailed description of the invention but by the appended claims, and all differences within the scope will be construed as being included in the present invention.

Like reference numerals in the drawings denote like or similar elements throughout the specification. In the following description and the attached drawings, well-known functions or constructions are not described in detail since they would obscure the present invention with unnecessary detail. Also, like reference numerals in the drawings denote like or similar elements throughout the specification.

Hereinafter, the present invention will be described in detail by explaining exemplary embodiments of the invention with reference to the attached drawings. The invention may, however, be embodied in many different forms, and should not be construed as being limited to the embodiments set forth herein; rather, these embodiments are provided so that this disclosure will be thorough and complete, and will fully convey the concept of the invention to those of ordinary skill in the art.

Throughout the specification, when an element is referred to as being "connected to" or "coupled with" another element, it can be "directly connected to or coupled with" the other element, or it can be "electrically connected to or coupled with" the other element by having an intervening element interposed therebetween. Also, when a part "includes" or "comprises" an element, unless there is a particular description contrary thereto, the part can further include other elements, not excluding the other elements.

Hereinafter, the inventive concept will be described in detail below with reference to accompanying drawings.

FIG. 1 is a block diagram illustrating an internal structure of a stereophonic sound reproducing apparatus according to an embodiment.

The stereophonic sound reproducing apparatus 100 according to an embodiment may output a multi-channel audio signal, in which a plurality of input channels are mixed to a plurality of output channels to reproduce. Here, when the number of output channels is less than the number of input channels, the input channels are down-mixed according to the number of output channels.

Stereophonic sound denotes sound, to which spatial information is added, allowing a listener to have an immersive feeling by reproducing a direction or feeling of distance of a sound, as well as an elevation and timbre of the sound, so that even a listener who does not exist in a space where a sound source has occurred may experience directional, distance, and spatial perceptions.

In the descriptions below, an output channel of an audio signal may denote the number of speakers that output sound. The more the output channels, the more the number of speakers from which the sound is output. The stereophonic sound reproducing apparatus 100 according to the embodiment may render and mix a multi-channel audio input signal to output channels that will reproduce the sound, so that the multi-channel audio signal from a large number of input channels may be output and reproduced in an environment where a less number of output channels are provided. Here, the multi-channel audio signal may include a channel capable of outputting an elevated sound.

The channel capable of outputting the elevated sound may denote a channel capable of outputting an audio signal via a speaker located above a head of a listener so that the listener may experience elevated feeling. A horizontal channel may denote a channel capable of outputting an audio signal via a speaker located on a horizontal plane with respect to the listener.

The above-described environment in which less number of output channels are provided may denote an environment in which the sound may be output via a speaker provided on a horizontal plane, without using an output channel capable of outputting the elevated sound.

In addition, in the descriptions below, a horizontal channel may denote a channel including an audio signal that may be output via a speaker provided on the horizontal plane. An overhead channel may denote a channel including an audio signal that may be output via a speaker that is provided on an elevated position, not on the horizontal plane, in order to output the elevated sound.

Referring to FIG. 1, the stereophonic sound reproducing apparatus 100 may include an audio core 110, a renderer 120, a mixer 130, and a post-processor 140.

The stereophonic sound reproducing apparatus 100 according to the embodiment may render, mix, and output a multi-channel input audio signal to an output channel to reproduce. For example, the multi-channel input audio signal may be a 22.2 channel signal, and the output channel to reproduce may be 5.1 or 7.1 channels. The stereophonic sound reproducing apparatus 100 performs a rendering by designating output channels to which channels of the multi-channel input audio signal will correspond, and performs mixing of the rendered audio signals by mixing signals of the channels respectively corresponding to the channels to reproduce and outputs a final signal.

An encoded audio signal is input to the audio core 110 in a format of a bitstream, and the audio core 110 decodes the input audio signal after selecting a decoder tool suitable for the encoded format of the audio signal.

The renderer 120 may render the multi-channel input audio signal to a multi-channel output channels according to channels and frequencies. The renderer 120 may perform three-dimensional (3D) rendering and two-dimensional (2D) rendering on the multi-channel audio signal according to overhead channels and horizontal channels. A configuration of the renderer and a detailed rendering method will be described in more detail later with reference to FIG. 2.

The mixer 130 may mix the signals of the channels corresponding to the horizontal channels by the renderer 120, and output the final signal. The mixer 130 may mix the signals of the respective channels according to each of predetermined sections. For example, the mixer 130 may mix the signals of the respective channels by one frame unit.

The mixer 130 according to the embodiment may perform the mixing based on power values of the signals that are rendered to the respective channels to produce. That is, the mixer 130 may determine amplitude of the final signal or a gain to be applied to the final signal based on the power values of the signals rendered to the respective channels to reproduce.

The post-processor 140 performs a controlling of a dynamic range with respect to a multi-band signal and binaurlaizing on an output signal of the mixer 130 to be suitable for the respective reproducing apparatus (speaker, headphones, etc.). An output audio signal output from the post-processor 140 is output via a device such as a speaker, and the output audio signal may be reproduced in a 2D or 3D manner according to the process performed by each element.

The stereophonic sound reproducing apparatus 100 illustrated with reference to FIG. 1 according to the embodiment is shown based on a configuration of an audio decoder, and other additional configurations are omitted.

Figure 2:
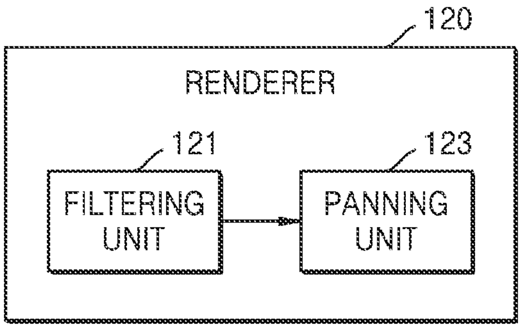
FIG. 2 is a block diagram of a renderer in the stereophonic sound reproduction apparatus according to the embodiment.

FIG. 2 is a block diagram illustrating configuration of the renderer among the configuration of the stereophonic sound reproducing apparatus according to an embodiment.

The renderer 120 includes a filtering unit 121 and a panning unit 123.

The filtering unit 121 compensates for a tone or the like of a decoded audio signal according to a location, and may perform filtering of an input audio signal by using a head-related transfer function (HRTF) filter.

The filtering unit 121 may render an overhead channel that has passed through the HRTF filter in different manners according to a frequency thereof, in order to perform 3D rendering on the overhead channel.

The HRTF filter may allow a stereophonic sound to be recognized according to a phenomenon in which a characteristic of a complicated path such as diffraction on a surface of a head, reflection by auricles, etc. is changed depending on a transfer direction of a sound, as well as a simple difference between paths such as an inter-aural level difference (ILD) and an inter-aural time difference (ITD) which occurs when a sound reaches two ears, etc. The HRTF filter may process the audio signals included in the overhead channel, that is, by changing sound quality of the audio signal so that the stereophonic sound may be recognized.

The panning unit 123 calculates and applies a panning coefficient that is to be applied to each frequency band and each channel, in order to pan the input audio signal with respect to each output channel. Panning of the audio signal denotes controlling a magnitude of a signal applied to each output channel, in order to render a sound source at a certain location between two output channels.

The panning unit 123 may render a low frequency signal among the overhead channel signals according to add-to-the-closest channel method, and may render a high frequency signal according to a multichannel panning method. According to the multichannel panning method, a gain value that is set to differ in channels to be rendered to each of channel signals is applied to signals of each of channels of a multichannel audio signal, so that each of the signals may be rendered to at least one horizontal channel. The signals of each channel to which the gain value is applied may be synthesized via mixing and may be output as a final signal.

Since the low frequency signal has a high diffractive property, even if each channel in the multi-channel audio signal is rendered only to one channel, without being rendered to various channels according to the multi-channel panning method, the listener may feel the sound quality similarly to each other. Therefore, the stereophonic sound reproducing apparatus 100 according to the embodiment may render the low frequency signal according to the add-to-the-closest channel method, and thus, sound quality degradation that may occur when various channels are mixed to one output channel may be prevented. That is, if various channels are mixed to one output channel, sound quality may be amplified or decreased due to interference between the channel signals and thus may degrade, and thus, the sound quality degradation may be prevented by mixing one channel to one output channel.

According to the add-to-the-closest channel method, each channel of the multi-channel audio signal may be rendered to a closest channel from among the channels to reproduce, instead of being rendered to various channels.

Also, the stereophonic sound reproducing apparatus 100 performs the rendering operation differently from the frequency, thereby increasing a sweet spot without degrading the sound quality. That is, the low frequency signal having a high diffractive property is rendered according to the add-to-the-closest channel method in order to prevent the sound quality degradation that may occur when various channels are mixed to one output channel. The sweet spot denotes a predetermined range in which the listener may optimally listen to the stereophonic sound that has not been distorted.

As the sweet spot is increased, the listener may optimally listen to the stereophonic sound that has not been distorted within a large range. In addition, if the listener does not exist within the sweet spot, the listener may listen to the sound, the sound quality or the sound image of which has been distorted.

Figure 3:
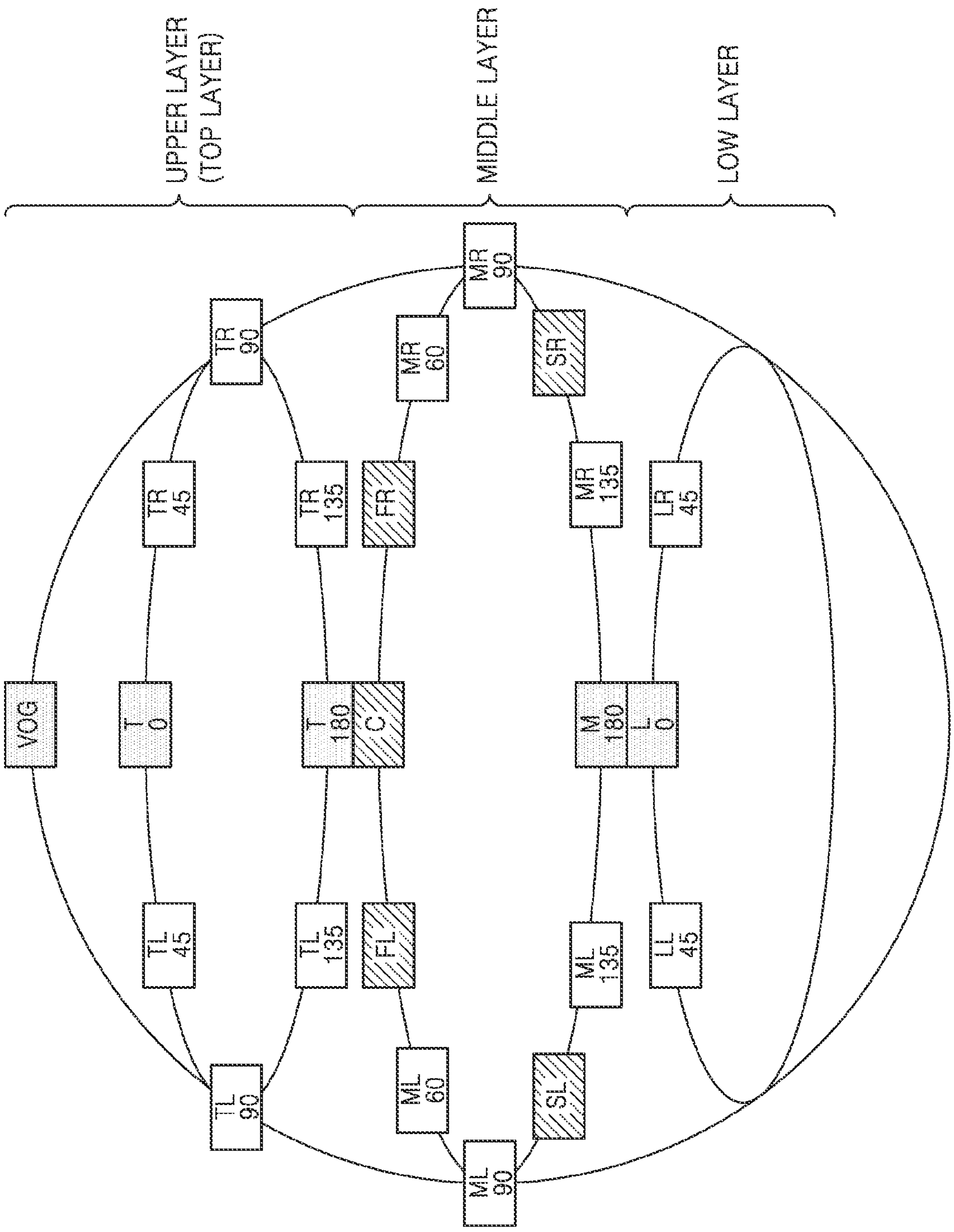
FIG. 3 is a diagram of a layout of channels in a case where a plurality of input channels are down-mixed to a plurality of output channels, according to an embodiment.

FIG. 3 is a diagram of a layout of channels in a case where a plurality of input channels are down-mixed to a plurality of output channels, according to an embodiment.

A technology for providing a stereophonic sound with a stereoscopic image has been being developed in order to provide a user with realism and immersive feeling that are equal to or more exaggerated than reality. A stereophonic sound denotes that an audio signal itself has an elevation of sound and spatiality, and in order to reproduce the stereophonic sound, at least two or more loud speakers, that is, output channels, are necessary. Also, a large number of output channels are necessary in order to accurately reproduce feelings of elevation, distance, and spatiality of the sound, except for a binaural stereophonic sound using an HRTF.

Therefore, various multi-channel systems such as a 5.1-channel system, the Auro 3D system, the Holman 10.2 channel system, the ETRI/Samsung 10.2 channel system, the NHK 22.2 channel system, etc., in addition to a stereo system having two output channels, have been suggested and developed.

FIG. 3 is a diagram illustrating an example in which a stereophonic audio signal of 22.2 channels is reproduced by a 5.1-channel output system.

A 5.1-channel system is a generalized name of a 5-channel surround multi-channel sound system, and has been widely distributed and used as home-theater in households and a sound system for theatres. All kinds of 5.1 channels include a front left (FL) channel, a center (C) channel, a front right (FR) channel, a surround left (SL) channel, and a surround right (SR) channel. As denoted in FIG. 3, since the output channels of the 5.1-channel system are placed on a same horizontal plane, the 5.1-channel system physically corresponds to 2D system. In order for the 5.1-channel system to reproduce stereophonic audio signals, a rendering process for granting 3D effect to a signal to be reproduced has to be performed.

The 5.1-channel system is widely used in various fields such as digital versatile disc (DVD) video, DVD sound, super audio compact disc (SACD), or digital broadcasting, as well as in movies. However, although the 5.1-channel system provides an improved spatiality when comparing with the stereo system, there are many restrictions in forming wider listening space. In particular, the 5.1-channel system forms a narrow sweet spot and may not provide a vertical sound image having an elevation angle, and thus, the 5.1-channel system may not be suitable for a wide listening space, e.g., a theater.

A 22.2-channel system suggested by NHK includes three-layers of output channels. An upper layer includes a Voice of God (VOG), T0, T180, TL45, TL90, TL135, TR45, TR90, and TR45 channels. Here, in the name of each channel, an index T denotes an upper layer, indexes L and R respectively denote left and right, and a number at the rear denotes an azimuth angle from a center channel.

A middle layer is on a same plane as the 5.1 channels, and includes ML60, ML90, ML135, MR60, MR90, and MR135 channels in addition to output channels of the 5.1 channels. Here, in the name of each channel, an index M at the front means a middle layer, and a number at the rear denotes an azimuth angle from a center channel.

A low layer includes L0, LL45, and LR45 channels. Here, an index L at the front of the name of each channel denotes a low layer, and a number at the rear denotes an azimuth angle from a center channel.

In the 22.2 channels, the middle layer is referred to as a horizontal channel, and the VOG, T0, T180, T180, M180, L, and C channels having azimuth angle of 0° or 180° are referred to as vertical channels.

When a 22.2 channel input signal is reproduced via the 5.1 channel system, the most general scheme is to distribute signals to channels by using a down-mix formula. Otherwise, an audio signal having an elevation may be reproduced through the 5.1-channel system by performing rendering to provide a virtual elevation.

Figure 4:
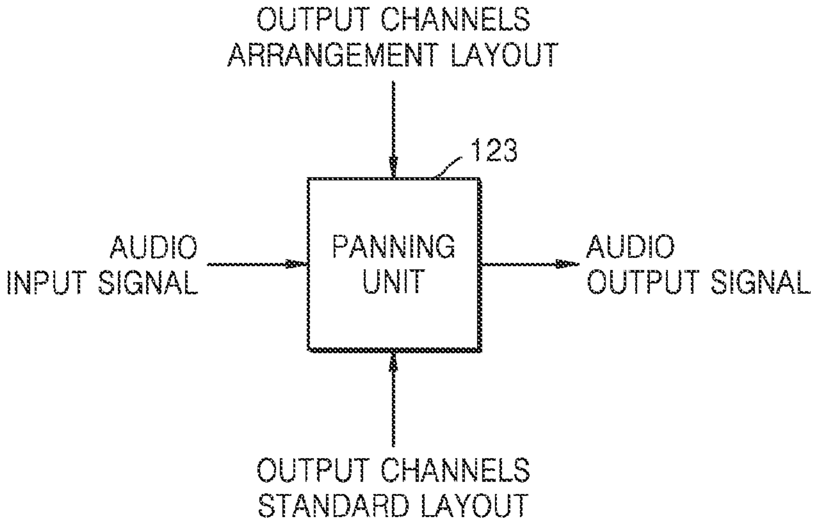
FIG. 4 is a diagram of a panning unit in a case where a positional deviation occurs between a standard layout and an arrangement layout of output channels, according to an embodiment.

FIG. 4 illustrates a panning unit according to an embodiment in a case where a positional deviation occurs between a standard layout and an arrangement layout of output channels.

When a multichannel input audio signal is reproduced by using a smaller number of output channels than the number of channels of an input signal, an original sound field may be distorted, and in order to compensate for the distortion, various techniques are being researched.

General rendering techniques are supposed to perform rendering based on a case where speakers, that is, output channels, are arranged according to the standard layout. However, when the output channels are not arranged to accurately match the standard layout, distortion of a location of a sound image and distortion of a tone occur.

The distortion of the sound image widely includes distortion of the elevation and distortion of a phase angle that are not sensitively felt in a relatively low level. However, due to a physical characteristic of a human body where both ears are located in left and right sides, if sound images of left-center-right sides are changed, the distortion of the sound image may be sensitively perceived. In particular, a sound image of a front side may be further sensitively perceived.

Therefore, as shown in FIG. 3, when the 22.2 channels are realized by using the 5.1 channels, it is particularly required not to change sound images of the VOG, T0, T180, T180, M180, L, and C channels located at 0° or 180°, rather than left and right channels.

When an audio input signal is panned, two processes are basically performed. The first process corresponds to an initializing process in which a panning gain with respect to an input multichannel signal is calculated according to a standard layout of output channels. In the second process, a calculated panning gain is modified based on a layout with which the output channels are actually arranged. After the panning gain modifying process is performed, a sound image of an output signal may be present at a more accurate location.

Therefore, in order for the panning unit 123 to perform processing, information about the standard layout of the output channels and information about the arrangement layout of the output channels are required, in addition to the audio input signal. In a case where the C channel is rendered from the L channel and the R channel, the audio input signal indicates an input signal to be reproduced via the C channel, and an audio output signal indicates modified panning signals output from the L channel and the R channel according to the arrangement layout.

Figure 5:
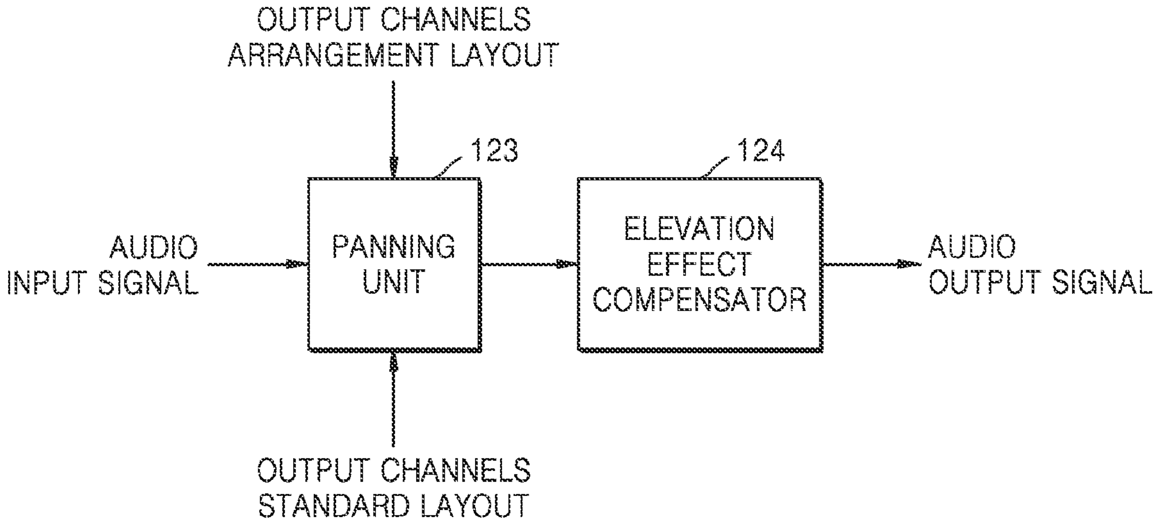
FIG. 5 is a diagram illustrating configuration of a panning unit in a case where there is an elevation deviation between a standard layout and an arrangement layout of output channels, according to an embodiment.

FIG. 5 is a diagram of a configuration of a panning unit according to an embodiment in a case where there is an elevation deviation between a standard layout and an arrangement layout of the output channels.

The 2D panning method that only takes into account the azimuth deviation as shown in FIG. 4 may not correct an effect caused by an elevation deviation if there is an elevation deviation between the standard layout and the arrangement layout of the output channels. Therefore, if there is an elevation deviation between the standard layout and the arrangement layout of the output channels, an elevation rising effect due to the elevation deviation has to be compensated for by an elevation effect compensator 124 as shown in FIG. 5.

In FIG. 5, the elevation effect compensator 124 and the panning unit 123 are shown as separate elements, but the elevation effect compensator 124 may be implemented as an element included in the panning unit 123.

Hereinafter, FIGS. 6 to 9 illustrate a method of determining a panning coefficient according to a layout of speakers in detail.

Figure 6A:
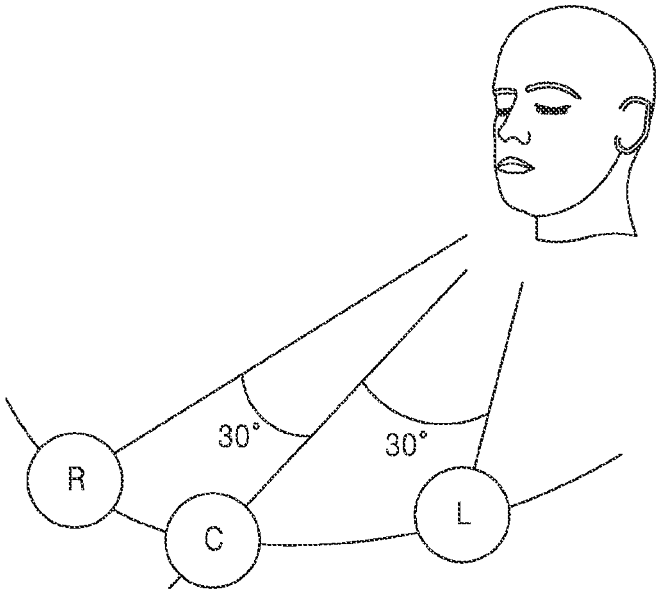
FIGS. 6A and 6B are diagrams showing locations of a sound image according to an arrangement layout of output channels, when a center channel signal is rendered from a left channel signal and a right channel signal.
Figure 6B:
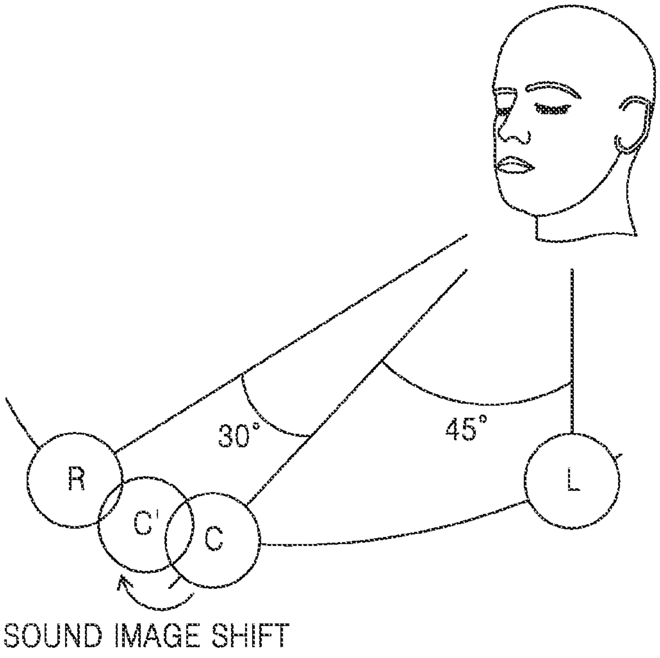

FIGS. 6A and 6B are diagrams showing a location of a sound image according to an arrangement layout of output channels, in a case where a center channel signal is rendered from a left channel signal and a right channel signal.

In FIGS. 6A and 6B, it is assumed that a C channel is rendered from the L channel and the R channel.

In FIG. 6A, the L channel and the R channel are located at a same plane while having azimuth angles of 30° to left and right sides from the C channel according to the standard layout. In this case, a C channel signal is rendered only by a gain obtained through an initialization of the panning unit 123 and is located at a regular position, and thus, there is no need to additionally modify the panning gain.

In FIG. 6B, the L channel and the R channel are located on a same plane like in FIG. 6A, and a location of the R channel matches the standard layout, whereas the L channel has the azimuth angle of 45° that is greater than 30°. That is, the L channel has an azimuth deviation of 15° with respect to the standard layout.

In the above case, the panning gain calculated through the initialization process is the same with respect to the L channel and the R channel, and when the panning gain is applied, a location of the sound image is determined to be C' that is biased toward the R channel. The above phenomenon occurs because the ILD varies depending on a change in the azimuth angle. When the azimuth angle is defined as 0° based on the location of the C channel, a level difference ILD of the audio signals reaching two ears of a listener increases as the azimuth angle increases.

Therefore, the azimuth deviation has to be compensated for by modifying the panning gain according to the 2D panning method. In a case shown in FIG. 5B, a signal of the R channel is increased or a signal of the L channel is reduced so that the sound image may be formed at the location of the C channel.

Figure 7A:
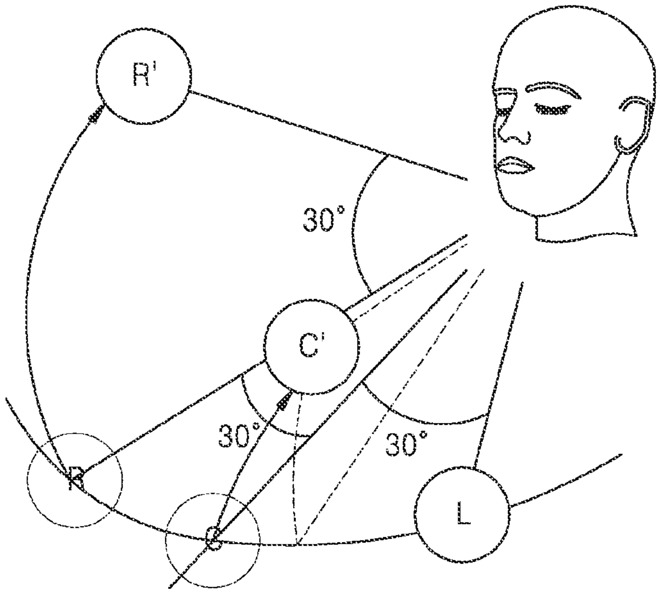
FIGS. 7A and 7B are diagrams showing localization of a location of a sound image by correcting an elevation effect according to an embodiment, if there is an elevation deviation in output channels.
Figure 7B:
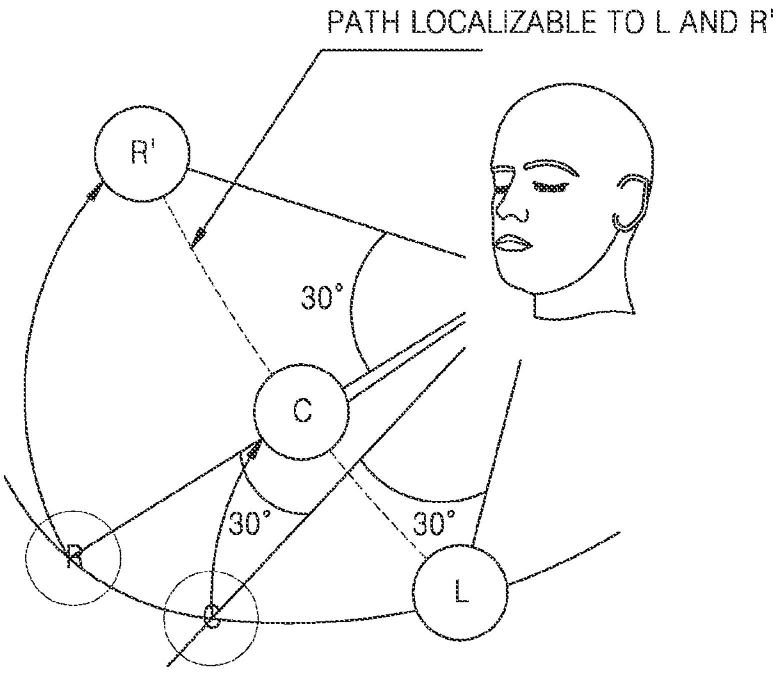

FIGS. 7A and 7B are diagrams showing localization of the sound image by compensating for the elevation effect according to an embodiment, when there is an elevation deviation between the output channels.

FIG. 7A shows a case in which the R channel is arranged on a location of R' having an elevation angle so as to have an azimuth angle of 30° that satisfies the standard layout, whereas the R channel is not located on the same plane as the L channel and has an elevation angle of 30° from the horizontal channel. In the above case, if the same panning gas is applied to the R channel and the L channel, location of the sound image C' that has been changed due to the change of the ILD according to the rising of the elevation of the R channel is not located at the center between the L channel and the R channel, but is biased toward the L channel.

This is because the ILD is changed due to the elevation rising like in the case where there is the azimuth deviation exists. If the elevation angle is defined to be 0° based on the horizontal channel, the level difference ILD of the audio signals reaching two ears of the listener is reduced as the elevation angle increases. Therefore, C' is biased toward the L channel that is the horizontal channel (having no elevation angle).

Therefore, the elevation effect compensator 124 compensates for the ILD of the sound having the elevation angle in order to prevent bias of the sound image. In more detail, the elevation effect compensator modifies the panning gain of the channel having the elevation angle to be increased so as to prevent the bias of the sound image and to form the sound image at the azimuth angle 0°.

FIG. 7B shows a location of the sound image that is localized through the compensation of the elevation effect. The sound image before compensation of the elevation effect is located at C', that is, a biased position toward the channel having no elevation angle as shown in FIG. 7A. However, when the elevation effect is compensated for, the sound image may be localized so as to be positioned at the center between the L channel and an R' channel.

Figure 8:
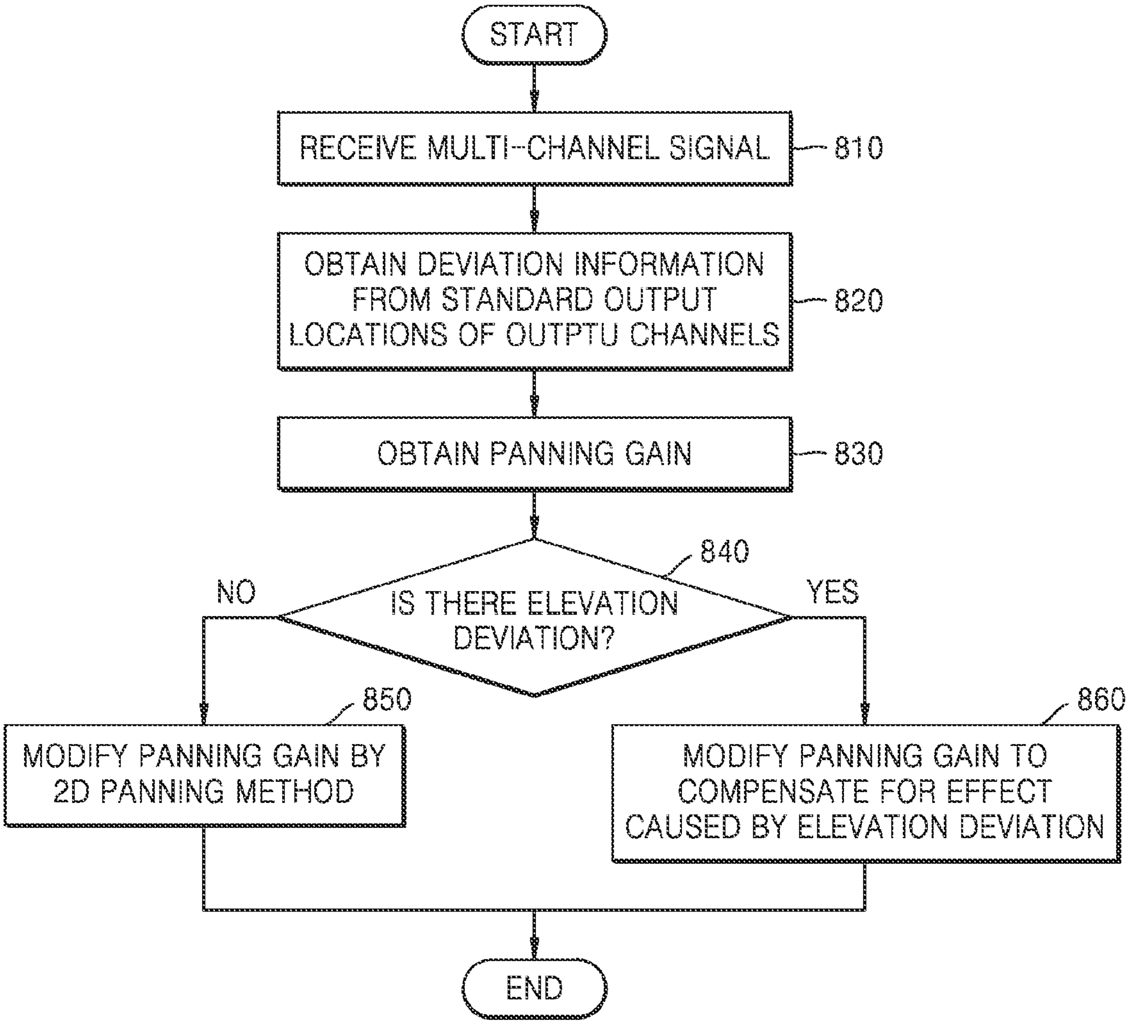
FIG. 8 is a flowchart illustrating a method of rendering a stereophonic audio signal, according to an embodiment.

FIG. 8 is a flowchart illustrating a method of rendering a stereophonic audio signal, according to an embodiment.

The method of rendering the stereophonic audio signal illustrated with reference to FIGS. 6 and 7 is performed in following order.

The renderer 120, in particular, the panning unit 123, receives a multi-channel input signal having a plurality of channels (810). For panning the received multi-channel input signal through multi-channel output, the panning unit 123 obtains deviation information about each of output channels by comparing locations where the speakers corresponding to the output channels are arranged with standard output locations (820).

Here, if the output channel includes 5.1 channels, the output channels are horizontal channels located on the same plane.

Deviation information may include at least one of information about an azimuth deviation and information about an elevation deviation. The information about the azimuth deviation may include the azimuth angle formed by a center channel and output channels on the horizontal plane where the horizontal channels exist, and information about the elevation deviation may include an elevation angle formed by the horizontal plane on which the horizontal channels exist and the output channel.

The panning unit 123 obtains a panning gain that is to be applied to the input multi-channel signal, based on the standard output location (830). Here, an order of the obtaining of the deviation information (820) and the obtaining of the panning gain (830) may be switched.

In operation 820, as a result of obtaining the deviation information about each output channel, if the deviation information exists in the output channel, the panning gain obtained in operation 830 has to be modified. In operation 840, it is determined whether there is an elevation deviation based on the deviation information obtained in operation 820.

If the elevation deviation does not exist, the panning gain is modified only by taking into account the azimuth deviation (850).

There may be various methods of calculating and modifying the panning gain. Representatively, a vector base amplitude panning (VBAP) method based on an amplitude panning or a tangent law may be used. Otherwise, in order to address the problem that the sweet spot has a narrow range, a method based on a wave field synthesis (WFS) that may provide relatively wide sweet spot by matching time delays of multi-speakers used in a reproduction environment in order to generate a waveform similar to a plane wave on a horizontal plane may be used.

Otherwise, when a transient signal such as raining sound, clapping sound, or the like and signals from various channels are down-mixed to one channel, the number of transient signals increases in one channel and a tone distortion such as whitening may occur. To address the above problem, a hybrid virtual rendering method that performs the rendering process after selecting a 2D (timbral)/3D (spatial) rendering modes according to an importance of a spatial perception and sound quality in each scene may be applied.

Otherwise, a rendering method that combines a virtual rendering for providing spatial perception and a technique using an active down-mix that improves sound quality by preventing comb-filtering during a down-mix process may be used.

If there is the elevation variation, the panning gain is modified while taking into account the elevation deviation (860).

Here, the modifying of the panning gain taking into account the elevation deviation includes a process of compensating for the rising effect according to the increase in the elevation angle, that is, modifies the panning gain so as to compensate for the ILD that is reduced according to the elevation increasing.

After modifying the panning gain based on the deviation information about the output channel, the panning process of the corresponding channel is finished. In addition, processes from operation 820, that is, obtaining the deviation information about each output channel, to operation 850 or 860, that is, modifying the panning gain that is to be applied to the corresponding channel, may be repeatedly performed as many as the number of output channels.

Figure 9:
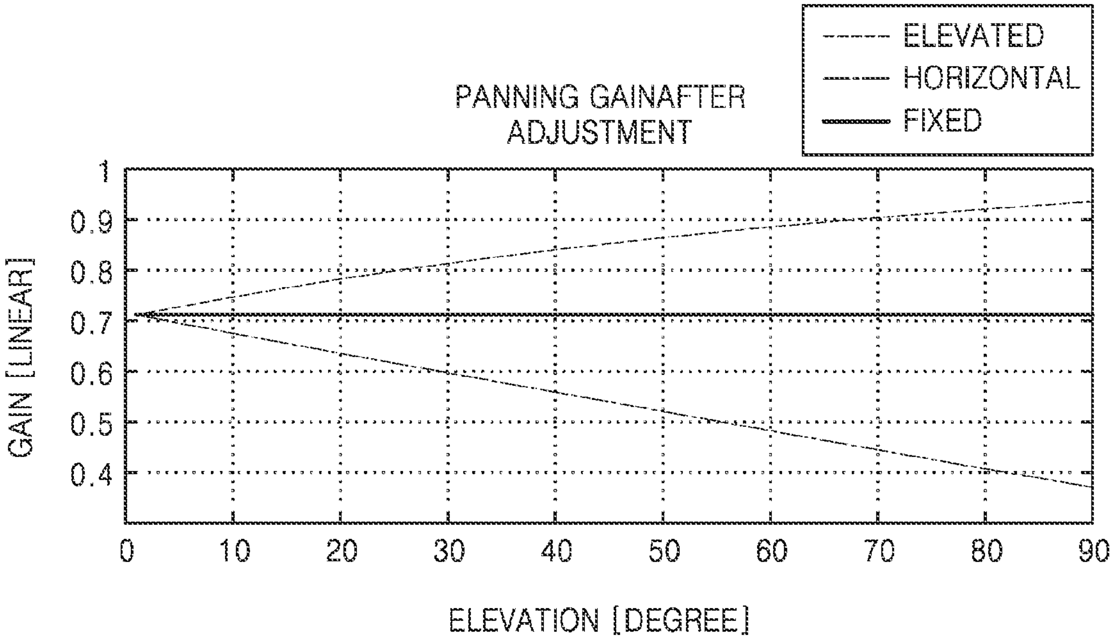
FIG. 9 is a diagram showing an elevation deviation versus a panning gain with respect to each channel when a center channel signal is rendered from a left channel signal and a right channel signal, according to an embodiment.

FIG. 9 is a diagram showing an elevation deviation versus a panning gain with respect to each channel, when a center channel signal is rendered from a left channel signal and a right channel signal, according to an embodiment.

FIG. 9 shows relation between the panning gains that are to be applied to a channel having the elevation angle (elevated) and a channel on a horizontal plane (fixed) and the elevation angle, as an embodiment of the elevation effect compensator 124.

When the C channel is rendered from the L channel and the R channel on the horizontal plane, panning gains $g_L$ and $g_R$ that will be applied to the L and R channels are equal to each other since the L channel and the R channel arranged on the horizontal plane are symmetric with each other, and each has a value of 0.707, that is, $g_L$, $=g_R=1/\sqrt{2}$. However, if one of the channels has the elevation angle as shown in the example of FIGS. 7A and 7B, the panning gain has to be modified according to the elevation angle in order to compensate for the effect caused by the elevation increase.

In FIG. 9, the panning gain is modified to increase by a ratio of 8 dB/90° according to the change in the elevation angle. With respect to the examples shown in FIGS. 7A and 7B, a gain of an elevated channel corresponding to the elevation angle 30° is applied to the R channel, and then, $g_R$ is modified to 0.81, that is, increased from 0.707, and a gain of a fixed channel is applied to the L channel, and then, $g_L$ is modified to 0.58, decreased from 0.707.

Here, the panning gains $g_L$ and $g_R$ have to satisfy Equation 2 below for energy normalization.

$$g_L^2+g_R^2=1 \tag{2}$$

According to the embodiment illustrated with reference to FIG. 9, the panning gain is modified to increase linearly by the ratio of 8 dB/90° according to the change in the elevation angle. However, the increasing ratio may vary depending on the example of the elevation effect compensator, or the panning gain may increase non-linearly.

Figure 10:
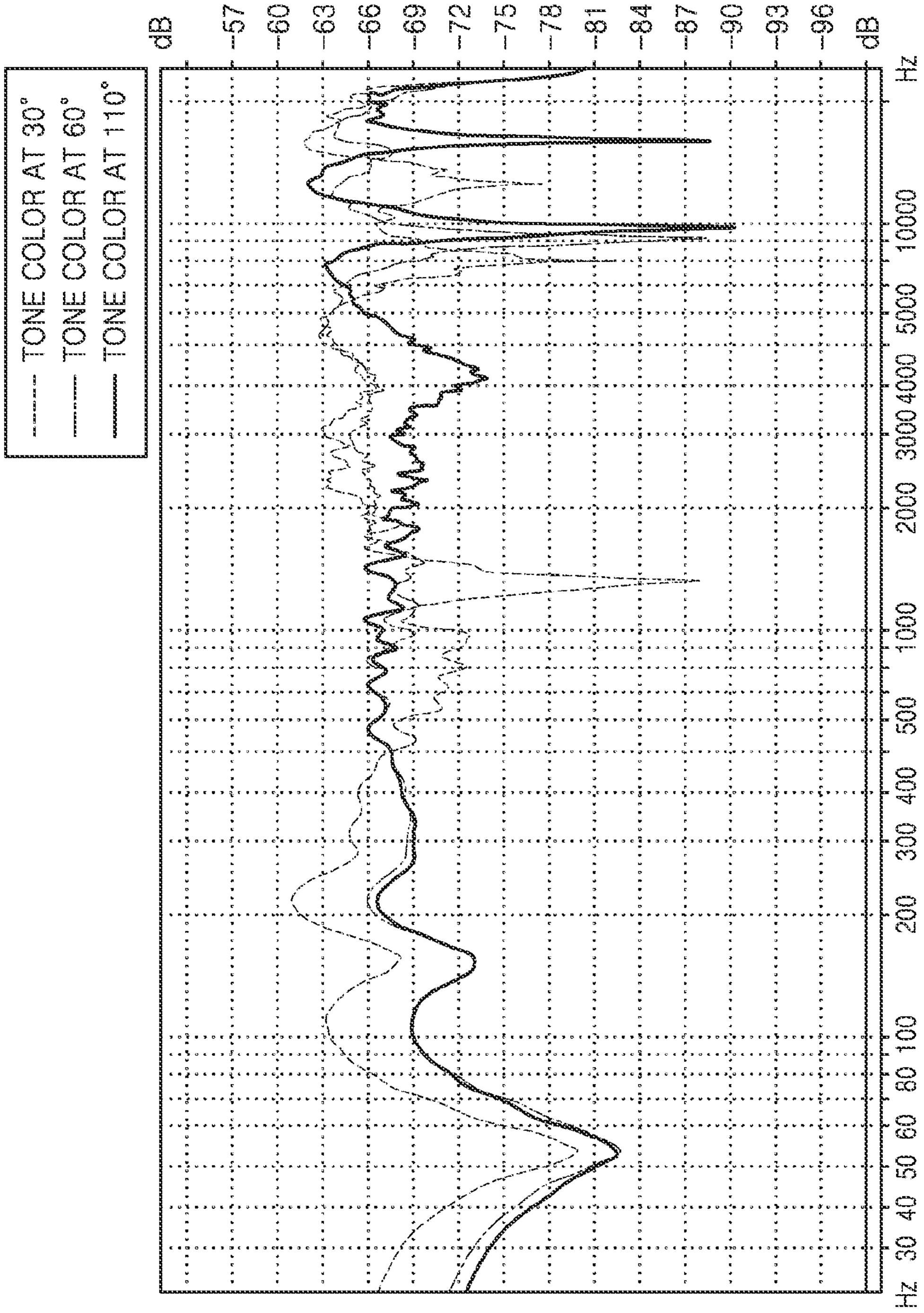
FIG. 10 is a diagram showing spectrums of tones at locations, according to a positional deviation between speakers.

FIG. 10 is a diagram showing spectrums of tone colors at different locations, according to a positional deviation between the speakers.

The panning unit 123 and the elevation effect compensator 124 process the audio signals so that the sound image may not be biased according to locations of the speakers corresponding to the output channels, but to be located at an original location. However, if the locations of the speakers corresponding to the output channels actually change, the sound image is not only changed, but the tone color is also changed.

Here, a spectrum of the tone color that a human being perceives according to the location of the sound image may be obtained based on an HRTF that is a function for transferring the sound image at a certain spatial location to human ears. The HRTF may be obtained by performing Fourier transformation on a head-related impulse response (HRIR) obtained from a time domain.

Since an audio signal from a spatial audio source propagates through the air and passes through an auricle, an external auditory canal, and an eardrum, a magnitude or a phase of the audio signal have changed. In addition, since a listener is also located in a sound field, the audio signal that is transferred is also changed due to a head, a torso, or the like of the listener. Therefore, the listener finally listens to a distorted audio signal. Here, a transfer function of the audio signal that the listener listens to, in particular, between an acoustic pressure and the audio signal, is referred to as HRTF.

Since each person has a unique size and shape of head, auricle, and torso, the HRTF is unique to each person. However, since it is impossible to measure the HRTF from each person, the HRTF may be modelled by using a common HRTF, a customized HRTF, etc.

A diffraction effect of a head is shown from about 600 Hz and is rarely shown after 4 kHz, and a torso effect that may be observed from 1 kHz to 2 kHz is increased as an audio source is located at ipsilateral azimuth and an elevation angle of the audio source is low, and is observed to 13 kHz at which the auricle dominantly affects sound image of the audio signal. Around a frequency of 5 kHz, a peak is shown due to resonance of the auricle. In addition, a first notch due to the auricle is shown within a range of 6 kHz to 10 kHz, a second notch due to the auricle is shown within a range of 10 kHz to 15 kHz, and a third notch due to the auricle is shown in a range of 15 kHz or greater.

In order to perceive the azimuth angle and the elevation angle, an ITD and an ILD of the audio source and peaks and notches shown in monaural spectral cues are used. The peaks and notches are generated due to the diffraction and dispersion of the torso, head, and auricle, and may be identified in the HRTF.

As described above, the HRTF varies depending on the azimuth angle and the elevation angle of the audio source. FIG. 10 shows a graph of the spectrum of tone color that a human being perceives according to a frequency of the audio source, in a case where the azimuth angle of the speaker is 30°, 60°, and 110°.

When comparing the tone colors of the audio signals according to the azimuth angles, the tone color of the azimuth angle of 30° has more intense component at 400 Hz or less by about 3 dB to about 5 dB, than that of the tone color of the azimuth angle of 60°. In addition, the tone color of the azimuth angle of 110° has less intense component within a range of 2 kHz to 5 kHz by about 3 dB, than that of the tone color of the azimuth angle of 60°.

Therefore, when the tone color conversion filtering is performed by using the characteristic of the tone color according to the azimuth angle, tone colors of a wideband signal provided to a listener may be similar to each other, and thus, the rendering may be performed more effectively.

Figure 11:
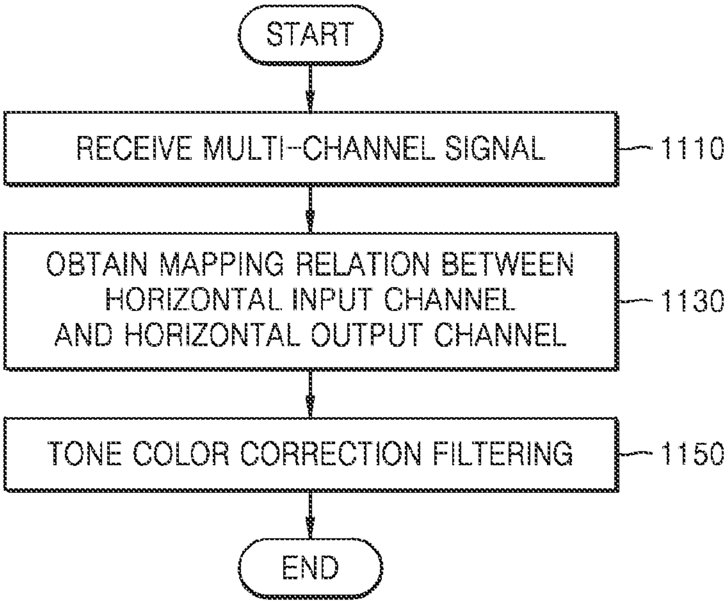
FIG. 11 is a flowchart illustrating a method of rendering a stereophonic audio signal according to an embodiment.

FIG. 11 is a flowchart illustrating a method of rendering a stereophonic audio signal, according to an embodiment.

FIG. 11 is a flowchart illustrating an embodiment of the method of rendering the stereophonic audio signal, that is, a method of performing a tone color conversion filtering on an input channel when the input channel is panned to at least two output channels.

A multi-channel audio signal that is to be converted to a plurality of output channels is input to the filtering unit 121 (1110). When a predetermined input channel from the input multi-channel audio signal is panned to at least two output channels, the filtering unit 121 obtains a mapping relation between the predetermined input channel and the output channels to which the input channel is to be panned (1130).

The filtering unit 121 obtains a tone color filter coefficient based on an HRTF about a location of the input channel and locations of the output channels for panning based on the mapping relation, and performs a tone color correction filtering by using the tone color filter coefficient (1150).

Here, the tone color correction filter may be designed by following processes.

Figure 12A:
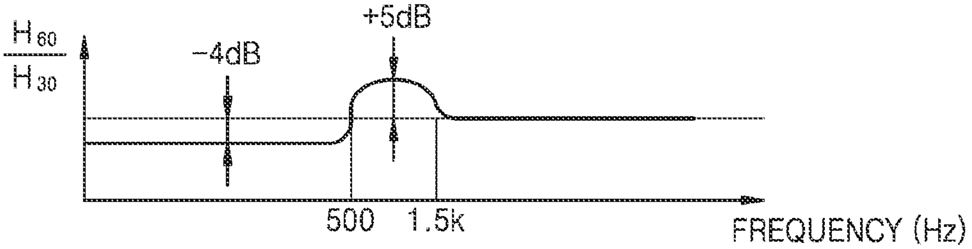
FIGS. 12A and 12B are diagrams for illustrating methods of designing sound quality correction filters, according to an embodiment.
Figure 12B:
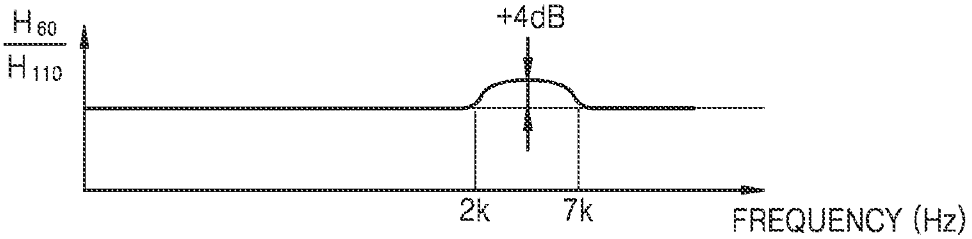

FIGS. 12A and 12B are diagrams illustrating a method of designing a tone color correction filter, according to an embodiment.

It is assumed that the HRTF transferred to a listener when an azimuth angle of the audio source is θ (degree) is defined as $H_\theta$, and an audio source having an azimuth angle of $\theta_S$ is panned (localized) to speakers located at azimuth angles of $\theta_{D1}$ and $\theta_{D1}$. In this case, the HRTF with respect to the azimuth angles are respectively $H_{\theta_s}$, $H_{\theta_{D1}}$, and $H_{\theta_{D2}}$.

Purpose of the tone color correction is to correct the sound reproduced from the speakers located at the azimuth angles of $\theta_{D1}$ and $\theta_{D1}$ to have similar tone color to that of the sound at the azimuth angle $\theta_S$, and thus, an output signal from the azimuth angle $\theta_{D1}$ passes through a filter having a transfer function such as $H_{\theta_S}/H_{\theta_{D1}}$, and an output signal from the azimuth angle $\theta_{D2}$ passes through a filter having a transfer function such as $H_{\theta_S}/H_{\theta_{D2}}$.

As a result of the above filtering, the sound reproduced from the speakers located at the azimuth angles $\theta_{D1}$ and $\theta_{D2}$ may be corrected to have similar tone colors to that of the sound from the azimuth angle of $\theta_S$.

In the example of FIG. 10, when the tone colors of the audio signals from the azimuth angles are compared with one another, the tone color at the azimuth angle of 30° has more intense component at 400 Hz or less by about 3 dB to about 5 dB, than that of the azimuth angle of 60°, and the tone color at the azimuth angle of 110° has a smaller component within a range of 2 kHz to 5 kHz by about 4 dB than that of the azimuth angle of 60°.

Since the purpose of the tone color correction is to correct the sound reproduced from the speakers located at the angles of 30° and 110° to have similar tone color to that of the sound reproduced at the angle of 60°, the component at 400 Hz or less in the sound reproduced from the speaker at the angle of 30° is reduced by 4 dB in order to make the tone color to be similar to that of the sound at the angle of 60°, and the component within the range of 2 kHz to 5 kHz in the sound reproduced from the speaker located at the angle of 110° is increased by 4 dB in order to make the tone color to be similar to that of the sound at the angle of 60°.

FIG. 12A shows a tone color correction filter that is to be applied to an audio signal from the azimuth angle of 60° to be reproduced through the speaker at the azimuth angle of 30°, wherein the sound quality correction filter is applied to an entire frequency section, that is, a ratio $H_{60}/H_{110}$ between the spectrum (HRTF) of the tone color when the azimuth angle is 60° and the spectrum (HRTF) of the tone color when the azimuth angle of 30° shown in FIG. 10.

In FIG. 12A, $H_{60}/H_{30}$ becomes a filter that reduces a magnitude of a signal by 4 dB at a frequency of 500 Hz or less, increases the magnitude of the signal by 5 dB at a frequency between 500 Hz to 1.5 kHz, and by-passes the signal of the other frequency domain, similarly to the above description.

FIG. 12B shows a sound quality correction filter that is to be applied to an audio signal from the azimuth angle 60° to be reproduced through the speaker at the azimuth angle of 110°, wherein the sound quality correction filter is applied to the entire frequency section, that is, a ratio $H_{60}/H_{110}$ between the spectrum (HRTF) of the tone color when the azimuth angle is 60° and the spectrum (HRTF) of the tone color when the azimuth angle is 110° shown in FIG. 10.

In FIG. 12B, $H_{60}/H_{30}$ becomes a filter that increases the magnitude of the signal at the frequency of 2 kHz to 7 kHz by 4 dB and by-passes the signal of the other frequency domain, similarly to the above description.

Figure 13A:
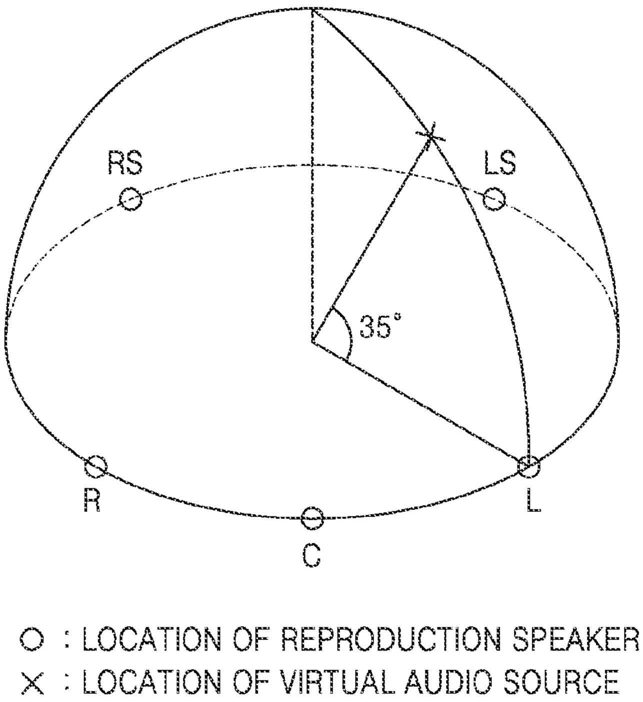
FIGS. 13A and 13B are diagrams showing examples in which an elevation deviation exists between output channels for 3D virtual rendering and a virtual sound source.
Figure 13B:
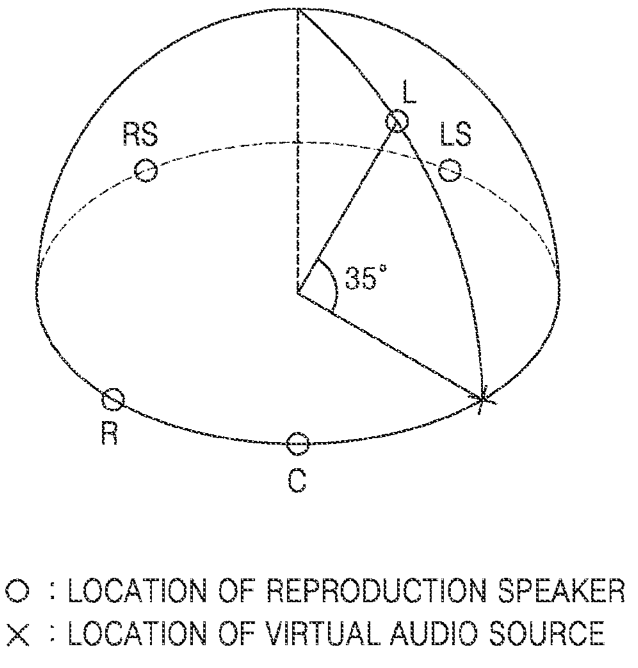

FIGS. 13A and 13B are diagrams showing cases where there is an elevation deviation between an output channel and a virtual audio source in a 3D virtual rendering.

A virtual rendering is a technique for reproducing 3D sound from a 2D output system such as the 5.1-channel system, that is, a rendering technique for forming a sound image at a virtual location where there is no speaker, in particular, at a location having an elevation angle.

Virtual rendering techniques that provide an elevation perception by using 2D output channels basically include two operations, that is, an HRTF correction filtering and a multi-channel panning coefficient distribution. The HRTF correction filtering denotes a tone color correction operation for providing a user with the elevation perception, that is, performs similar functions as those of the tone color correction filtering described above with reference to FIGS. 10 to 12.

Here, as shown in FIG. 13A, it is assumed that the output channels are arranged on a horizontal plane, and an elevation angle φ of a virtual audio source is 35°. In this case, an elevation difference between an L channel, that is, a reproducing output channel, and the virtual audio source is 35, and the HRTF with respect to the virtual audio source may be defined as $H_{E(35)}$.

On the contrary, as shown in FIG. 13B, it is assumed that the output channel has a greater elevation angle. In this case, although an elevation difference between the L channel, that is, the reproducing output channel, and the virtual audio source is 35, the output channel has a greater elevation angle, the HRTF with respect to the virtual audio source may be defined as $H_{E(-35)}$.

Here, a relationship expressed by an equation $H_{E(-35)}=1/H_{E(35)}$ may be obtained. In addition, if there is no elevation difference between the virtual audio source and the output channel, the tone color correction by using the elevation correction filter $H_{E(\phi)}$ is not performed.

The above rendering operation may be generalized as shown in Table 1 below.

TABLE 1

| Elevation angle of virtual audio source | Elevation angle of reproduction speaker (output channel) | Whether to use tone color conversion filter | Filter type (filter coefficient) |
|---|---|---|---|
| 0° | 0° | Not used | |
| 0° | φ° | Used | $1/H_{E(\phi)}$ |
| φ° | 0° | Used | $H_{E(\phi)}$ |
| φ° | φ° | Not used | |

Here, a case where the tone color conversion filter is not used is the same as a case where a by-pass filtering is performed. Table 1 above may be applied to a case when the elevation difference is within a predetermined range from φ, as well as a case when the elevation difference is accurately φ or −φ.

Figure 14:
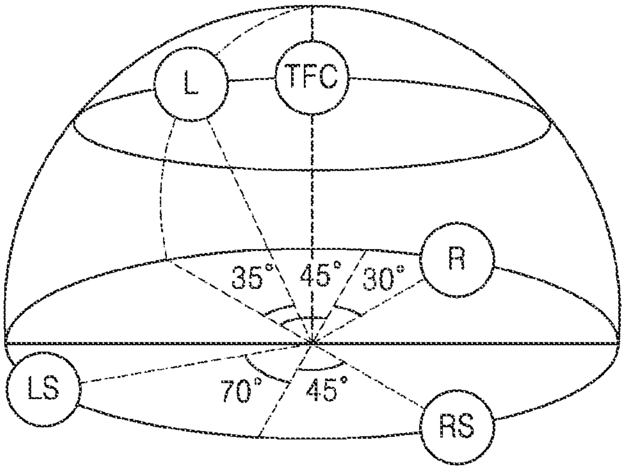
FIG. 14 is a diagram for illustrating a method of virtual rendering a TFC channel by using L/R/LS/RS channels according to an embodiment.

FIG. 14 is a diagram illustrating a virtual rendering of a TFC channel by using L/R/LS/RS channels, according to an embodiment.

The TFC channel is located at an azimuth angle of 0° and an elevation angle of 35°, and locations of horizontal channels L, R, LS, and RS for virtually rendering the TFC channel are as shown in FIG. 14 and Table 2 below.

TABLE 2

| Speaker (output channel) | Azimuth angle (azimuth) | Elevation angle (elevation) |
|---|---|---|
| L | −45° | 35° |
| R | 30° | 0° |
| LS | −110° | 0° |
| RS | 135° | 0° |

As shown in FIG. 14 and Table 2 above, the R channel and the LS channel are arranged according to the standard layout, the RS channel has an azimuth deviation of 25°, and the L channel has an elevation deviation of 35° and an azimuth deviation of 15°.

The method of applying the virtual rendering to the TFC channel by using the L/R/LS/RS channels according to an embodiment is performed in following order.

Firstly, a panning coefficient is calculated. The panning gain may be calculated by loading initial values for virtual rendering of the TFC channel, wherein the initial values are stored in a storage, or by using a 2D rendering, a VBAP, etc.

Secondly, the panning coefficient is modified (corrected) according to the arrangement of channels. When the layout of the output channels is as shown in FIG. 14, the L channel has the elevation deviation, a panning gain that is modified by the elevation effect compensator 124 is applied to the L channel and the R channel for performing a pair-wise panning using the L-R channels. On the other hand, since the RS channel has the azimuth deviation, a panning coefficient that is modified by a general method is applied to the LS channel and the RS channel for performing the pair-wise panning using the LS-RS channels.

Thirdly, the tone color is corrected by the tone color conversion filter. Since the R channel and the LS channel are arranged according to the standard layout, a filter $H_E$ that is the same as that of the original virtual rendering is applied thereto.

Since the RS channel only has the azimuth deviation and no elevation deviation, the filter $H_E$ that is the same as that of the original virtual rendering operation is used, but a filter $H_{M110}/H_{M135}$ for correcting the component shifted from 110° that is the azimuth angle of the RS channel according to the standard layout to the azimuth angle 135°. Here, $H_{M110}$ is an HRTF with respect to the audio source at the angle of 110° and $H_{M135}$ is an HRTF with respect to the audio source at the angle of 135°. However, in this case, since the azimuth angles 110° and 135° are relatively close to each other, the TFC channel signal rendered to RS output channel may be by-passed.

The L channel has both the azimuth deviation and the elevation deviation from the standard layout, and thus, the filter $H_E$ that is to be applied originally for performing the virtual rendering, a filter $H_{T000}/H_{T045}$ for compensating for the tone color of the TFC channel and the tone color at the location of the L channel is applied. Here, $H_{T000}$ is an HRTF with respect to the standard layout of the TFC channel, and $H_{T045}$ is an HRTF with respect to the location where the L channel is arranged. Otherwise, in the above case, since the location of the TFC channel and the location of the L channel are relatively close to each other, it may be determine to by-pass the TFC channel signal rendered to L output channel.

The rendering unit generates an output signal by filtering the input signal and multiplying the input signal by the panning gain, and the panning unit and the filtering unit operate independently from each other. This will be cleared with reference to a block diagram of FIG. 15.

Figure 15:
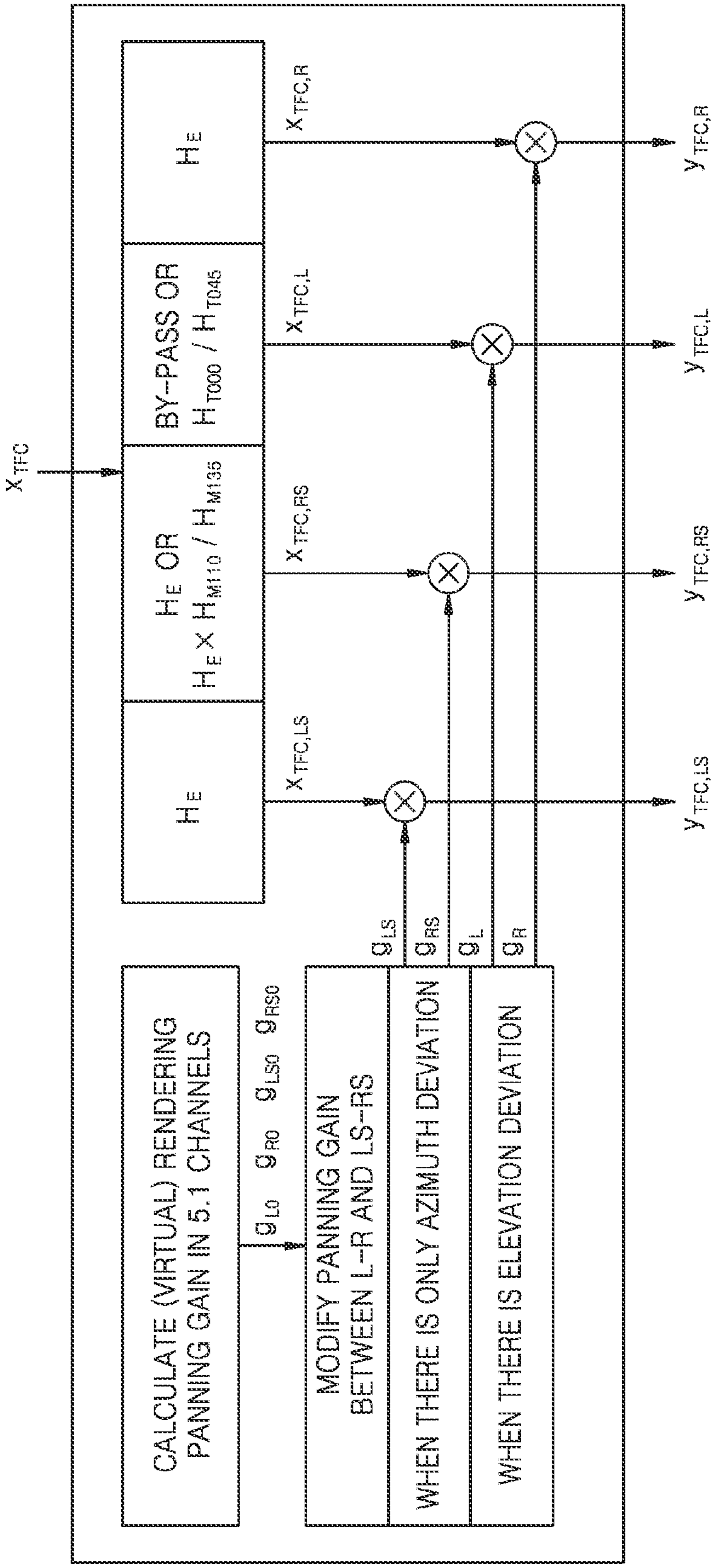
FIG. 15 is a block diagram of a renderer for processing a deviation in a virtual rendering by using 5.1 output channels, according to an embodiment.

FIG. 15 is a block diagram of a renderer that processes a deviation in a virtual rendering by using 5.1 output channels, according to an embodiment.

The block diagram of the renderer shown in FIG. 15 illustrates an output and a process of each block, when the L/R/LS/RS output channels that are arranged according to the layout of FIG. 14 are used to perform the virtual rendering of the TFC channel by using the L/S/LS/RS channels like in the embodiment illustrated with reference to FIG. 14.

The panning unit firstly calculates a virtual rendering panning gain in the 5.1 channels. In the embodiment shown in FIG. 14, the panning gain may be determined by loading initial values that are set to perform the virtual rendering of the TFC channel by using the L/R/LS/RS channels. Here, the panning gains determined to be applied to the L/R/LS/RS channels are $g_{L0}$, $g_{R0}$, $g_{LS0}$, and $g_{RS0}$.

In a next block, the panning gains between the L-R channels and the LS-RS channels are modified based on the deviation between the standard layout of the output channels and the arrangement layout of the output channels.

In a case of the LS-RS channels, since the LS channel only has the azimuth deviation, the panning gains may be modified by a general method. Modified panning gains are $g_{LS}$ and $g_{RS}$. In a case of the L-R channels, since the R channel has the elevation deviation, the panning gains are modified by the elevation effect compensator 124 for correcting the elevation effect. Modified panning gains are $g_L$ and $g_R$.

The filtering unit 121 receives an input signal $X_{TFC}$, and performs the filtering operation with respect to each channel. Since the R channel and the LS channel are arranged according to the standard layout, the filter $H_E$ that is the same as that of the original virtual rendering operation is applied thereto. Here, outputs from the filter are $X_{TFC,\ R}$ and $X_{TFC,\ LS}$.

Since the RS channel has no elevation deviation and only has the azimuth deviation, the filter $H_E$ that is the same as that of the original virtual rendering is used, and a correction filter $H_{M110}/H_{M135}$ is applied to a component that is shifted from the azimuth angle 110° of the LS channel according to the standard layout to the angle 135°. Here, an output signal from the filter is $X_{TFC,\ RS}$.

The L channel has both the azimuth deviation and the elevation deviation with respect to the standard layout, and thus, the filter $H_E$ that is originally applied for performing the virtual rendering is not applied, but a filter $H_{T000}/H_{T045}$ is applied for correcting a tone color of the TFC channel and a tone color at the location of the L channel. Here, an output signal from the filter is $X_{TFC,\ L}$.

The output signals from the filters applied respectively to the channels, that is, $X_{TFC,\ L}$, $X_{TFC,\ R}$, $X_{TFC,\ LS}$, and $X_{TFC,\ RS}$ are multiplied by the panning gains $g_L$, $g_R$, $g_{LS}$, and $g_{RS}$ that are modified by the panning unit to output signals $Y_{TFC,\ L}$, $Y_{TFC,\ R}$, $Y_{TFC,\ LS}$ and $Y_{TFC,\ RS}$ from the renderer with respect to the channel signals.

The embodiments according to the present invention can also be embodied as programmed commands to be executed in various computer configuration elements, and then can be recorded to a computer readable recording medium. The computer readable recording medium may include one or more of the programmed commands, data files, data structures, or the like. The programmed commands recorded to the computer readable recording medium may be particularly designed or configured for the invention or may be well known to one of ordinary skill in the art of computer software fields. Examples of the computer readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), flash memories, and the like. Examples of the programmed commands include not only machine codes generated by a compiler but also include great codes to be executed in a computer by using an interpreter. The hardware apparatus can be configured to function as one or more software modules so as to perform operations for the invention, or vice versa.

While the detailed description has been particularly described with reference to non-obvious features of the present invention, it will be understood by one of ordinary skill in the art that various deletions, substitutions, and changes in form and details of the aforementioned apparatus and method may be made therein without departing from the spirit and scope of the following claims.

Therefore, the scope of the present invention is defined not by the detailed description but by the appended claims, and all differences within the scope will be construed as being included in the present invention.

What is claimed is:

1. A method of rendering an audio signal, the method comprising:

receiving multi-channel signals including a height input channel signal and a horizontal input channel signal, wherein the multi-channel signals include a first audio scene and a second audio scene, the first audio scene including a general sound and the second audio scene including an applause sound;

identifying an input channel layout of the multi-channel signals and an output channel layout of a plurality of output channel signals, wherein the output channel layout is a 5.1 channel layout;

obtaining a panning gain for the horizontal input channel signal based on a standard loudspeaker position;

obtaining a filter coefficient for the horizontal input channel signal based on the standard loudspeaker position, wherein the standard loudspeaker position is defined as in the output channel layout, and the panning gain and the filter coefficient are applied to a spatial elevation rendering and a timber elevation rendering;

obtaining deviation information between an actual loudspeaker position and the standard loudspeaker position, wherein the deviation information indicates a difference between the actual loudspeaker position and the standard loudspeaker position, the deviation information includes an elevation deviation and an azimuth deviation;

modifying the filter coefficient by using an inverse form of a filter coefficient for a spatial elevation rendering to provide a tone color, when the elevation deviation is larger than an predetermined value, wherein a level of the modified filter coefficient is within a level of 4 dB; and rendering the multi-channel signals including the height input channel signal to the plurality of output channel signals, wherein the first audio scene of the multi-channel signals is rendered by the spatial elevation rendering for a 3D sound based on the modified filter coefficient, and the second audio scene of the multi-channel signals is rendered by a timber elevation rendering for a 2D sound based on the modified filter coefficient.

2. The method of claim 1, further comprising identifying a mapping relation between the height input channel signal and at least two output channel signals among the plurality of output channel signals.

3. The method of claim 1, further comprising obtaining a panning gain and a filter coefficient for the height input channel signal based on a standard loudspeaker position; and modifying the panning gain and the filter coefficient for the height input channel signal based on the elevation deviation, wherein the modified panning gain and the filter coefficient are used the spatial elevation rendering.

* * * * *